United States Patent
Niwa et al.

[11] Patent Number: 6,001,470
[45] Date of Patent: Dec. 14, 1999

[54] CALCINING TOOL MATERIAL AND METHOD OF FABRICATING THEREOF

[75] Inventors: Shigeki Niwa; Tadashi Kimura; Hiroshi Okada; Toshiyuki Suzuki, all of Aichi; Kenithi Urathuji, Hyogo; Ataru Nishikawa, Hyogo; Mamoru Uemura, Hyogo, all of Japan

[73] Assignee: Toshiba Ceramics Co., Ltd,, Tokyo, Japan

[21] Appl. No.: 08/979,856

[22] Filed: Nov. 26, 1997

[30] Foreign Application Priority Data

Nov. 27, 1996 [JP] Japan .................................... 8-330196

[51] Int. Cl.⁶ .................................................... H01G 13/00
[52] U.S. Cl. .............................. 428/336; 51/295; 51/307; 51/309; 428/697; 428/699; 428/701; 428/702; 427/446; 427/453
[58] Field of Search ..................... 428/697, 699, 428/701, 702, 336, 446, 453; 51/295, 307, 309

[56] References Cited

U.S. PATENT DOCUMENTS

| | | | |
|---|---|---|---|
| 4,525,464 | 6/1985 | Claussen et al. | 501/103 |
| 4,588,607 | 5/1986 | Uatarese et al. | 427/34 |
| 4,877,705 | 10/1989 | Polido | 428/701 |
| 5,771,764 | 6/1998 | Chatterjee et al. | 83/13 |

FOREIGN PATENT DOCUMENTS

| | | |
|---|---|---|
| 57-71671 | 5/1982 | Japan . |
| 3-77652 | 12/1991 | Japan . |
| 4-586 | 1/1992 | Japan . |
| 4-21330 | 4/1992 | Japan . |
| 5-178673 | 7/1993 | Japan . |

*Primary Examiner*—Archene Turner
*Attorney, Agent, or Firm*—Foley & Lardner

[57] ABSTRACT

A calcining tool material, comprising a flame-spray zirconia coating layer made of unstabilized zirconia and stabilized or partially-stabilized zirconia in admixture, formed on the surface of an alumina-silica-based substrate having an $Al_2O_3$ content of not less than 65% by weight.

19 Claims, 2 Drawing Sheets

DISTRIBUTION OF CONCENTRATION OF ZIRCONIUM

DISTRIBUTION OF CONCENTRATION OF YTTRIUM AS STABILIZING COMPONENT

CALCINING TOOL MATERIAL AND METHOD OF FABRICATING THEREOF

BACKGROUND OF THE INVENTION

1. Field of the Invention

The present invention relates to a calcining tool material for use in the calcining of powder metallurgical products or functional ceramics.

2. Description of the Related Art

It has heretofore been a common practice that a calcining tool material for use in the calcining of powder metallurgical products or functional ceramics is coated with a dense film having a low reactivity in order to inhibit the reaction of components in the calcining tool material with the material to be calcined or the absorption of components contained in the material to be calcined by the calcining tool material that would causes the deterioration of the material to be calcined. As the material to be used in such a film there has been widely used zirconia having a low reactivity. As the substrate for calcining tool material there has been widely used an alumina-silica-based material taking into account the cost and durability.

Examples of method for forming a coating layer as mentioned above on the surface of such a calcining tool material include a method which comprises forming a substrate, optionally calcining the substrate, casting or spraying a slurried coating material onto the surface of the substrate, and then calcining the coated material, a method which comprises fixing a coating material to the same substrate as mentioned above with an adhesive, and a method which comprises forming a coating layer on a substrate by a flame spraying method while being baked.

Particularly desirable among these methods is the flame spraying method because it can form a dense coating layer. When used repeatedly, even the calcining tool material having a coating layer formed thereon by the flame spraying method can be subject to peeling of the coating layer that causes the substrate to be exposed, disabling desired calcining.

The peeling of the dense coating layer formed on the surface of a calcining tool material by flame-spraying method is mainly attributed to the difference in thermal expansion coefficient between the substrate and the flame spray coating layer or the residual expansion of the coating layer caused by the destabilization of the coating layer due to the incorporation of stabilized or partially-stabilized zirconia. Various countermeasures have heretofore been worked out against the peeling of the coating layer attributed to the difference in thermal expansion coefficient the substrate of the calcining tool material and the coating layer formed thereon. However, no significant countermeasures have been worked out against the peeling of the coating layer attributed to the residual expansion of zirconia caused by the destabilization of zirconia.

JP-B-3-77652 (The term "JP-B" as used herein means an "examined Japanese patent publication") proposes that stabilized zirconia having CaO content of from 4 to 31% by weight be flame-sprayed onto the surface of an alumina-silica-based substrate with $Al_2O_3$ content in the substrate and the content of a stabilizer in zirconia controlled such that the thermal expansion coefficient of zirconia almost coincides with that of the alumina-silica-based substrate. However, an alumina-silica-based substrate has CaO content of about from 4 to 5% by weight at largest from the standpoint of thermal expansion coefficient and reactivity with the material to be calcined. Thus, the content of CaO in the stabilized zirconia can be hardly raised any more. Further, if a calcining tool material coated with a flame spray coating layer of stabilized zirconia having such a single composition is used many times, the coating layer is often peeled mainly due to the residual expansion of zirconia part.

JP-B-4-586, which is another prior art, proposes that stabilized zirconia having CaO content of from 4 to 15% by weight be flame-sprayed onto an alumina-based substrate in such a manner that CaO content decreases from the surface of the alumina-based substrate toward the surface of the coating layer. In some detail, the coating layer has higher CaO content toward the substrate to have a thermal expansion coefficient as high as that of the substrate. On the contrary, the coating layer has lower CaO content toward its surface to have a lower thermal expansion coefficient. According to this proposal, flame spraying is effected batchwise in a plurality of layers, adding to cost. Further, these layers each form a flame spray coating layer of a single stabilized zirconia. Therefore, such a calcining tool material is disadvantageous in that when used many times, the coating layer is peeled mainly due to the residual expansion of zirconia part.

JP-B-4-21330 proposes that a flame spray coating layer of alumina be provided interposed between an alumina-based substrate and a flame spray coating layer of zirconia to reduce the difference in thermal expansion coefficient between the substrate and the zirconia layer. In some detail, the thermal expansion coefficient at 1,000° C. decreases in the order of stabilized zirconia, partially-stabilized zirconia, alumina and alumina-based substrate. Thus, an attempt was made to reduce the difference in thermal expansion coefficient between the substrate and the alumina layer by providing an alumina layer interposed between the substrate and the flame spray coating layer of zirconia. However, thisproposal, too, requires two or more kinds of flame spraying steps, adding to cost. This proposal is also disadvantageous in that the coating layer, if it is made of stabilized zirconia or partially-stabilized zirconia, is peeled due to the residual expansion similarly to JP-B-4-586.

JP-A-5-178673 (The term "JP-A" as used herein means an "unexamined published Japanese patent application") proposes that the same flame spray coating layer of alumina as in JP-B-4-21330 be provided interposed between an alumina-silica-based substrate and a flame spray coating layer of unstabilized zirconia. However, this proposal, too, adds to cost. This proposal is also disadvantageous in that the coating layer, if it is made of unstabilized zirconia alone, is liable to remarkable weakening of structure attributed to abnormal expansion and shrinkage due to transformation characteristic of unstabilized zirconia caused by repeated heat history during use. Thus, the calcining tool material thus proposed is soon worn to tatters.

SUMMARY OF THE INVENTION

An object of the present invention is to provide a calcining tool material which has a high peel strength and highly improved durability, even when repeatedly heated and cooled as a calcining tool material.

According to the present invention, there is provided a calcining tool material which comprises unstabilized zirconia and stabilized or partially-stabilized zirconia incorporated in admixture in a flame spray coating layer of zirconia formed on the surface of the substrate of the calcining tool material. In the above calcining tool material, even when repeatedly heated and cooled as a calcining tool material, the residual expansion of stabilized zirconia in particular is absorbed, minimizing the peeling of the flame spray coating layer and hence drastically improving the durability of the calcining tool material.

A first aspect of the calcining tool material of the present invention is a material which comprises an alumina-silica-based substrate having an $Al_2O_3$ content of not less than 65% by weight and a flame-sprayed zirconia coating layer made of unstabilized zirconia and stabilized or partially-stabilized zirconia in admixture, formed on the surface of the alumina-silica-based substrate.

A second aspect of the calcining tool material of the present invention is a material according to the first aspect wherein said stabilized or partially-stabilized zirconia is obtained by stabilizing with CaO.

A third aspect of the calcining tool material of the present invention is a material according to the first aspect wherein said stabilized or partially-stabilized zirconia is obtained by stabilizing with $Y_2O_3$.

A fourth aspect of the calcining tool material of the present invention is a material according to the first aspect wherein said stabilized or partially-stabilized zirconia is obtained by stabilizing with CaO and $Y_2O_3$.

A fifth aspect of the calcining tool material of the present invention is a material according to the first aspect wherein said stabilized or partially-stabilized zirconia is obtained by stabilizing with $CaCO_3$.

A sixth aspect of the calcining tool material of the present invention is a material according to the first aspect wherein said stabilized or partially-stabilized zirconia is obtained by stabilizing with $Ca(OH)_2$.

A seventh aspect of the calcining tool material of the present invention is a material according to the first aspect wherein said flame-sprayed zirconia coating layer comprises 5–50 weight % of unstabilized zirconia.

An eighth aspect of the calcining tool material of the present invention is a material according to the first aspect wherein said flame-sprayed zirconia coating layer comprises 10–30 weight % of unstabilized zirconia.

A ninth aspect of the calcining tool material of the present invention is a material according to the first aspect wherein said flame-sprayed zirconia coating layer has a thickness of 200–1000 µm.

A tenth aspect of the method of fabricating a calcining tool material of the present invention is a method which comprises the steps of:

preparing a mixture material by mixing an unstabilized zirconia and stabilized or partially-stabilized zirconia; and flame-spraying the mixture in admixture onto a surface of an alumina-silica-based substrate having an $Al_2O_3$ content of not less than 65% by weight to form a flame-spray coating layer made of unstabilized zirconia and stabilized or partially-stabilized zirconia thereon.

An eleventh aspect of the method of fabricating a calcining tool material of the present invention is a method according to the tenth aspect, wherein the step of preparing a mixture material comprises previously mixing unstabilized zirconia and stabilized or partially-stabilized zirconia; and granulating the mixture material; and the step of flame-spraying the granulated material to form a flame-spray coating layer.

A twelfth aspect of the method of fabricating a calcining tool material of the present invention is a method according to the tenth aspect, wherein the step of preparing a mixture material comprises a step of mixing unstabilized zirconia and calcium carbonate as an stabilizing agent.

A thirteenth aspect of the method of fabricating a calcining tool material of the present invention is a method according to the tenth aspect, wherein the step of preparing a mixture material comprises a step of mixing unstabilized zirconia and yttrium oxide as an stabilizing agent.

A fourteenth aspect of the method of fabricating a calcining tool material of the present invention is a method according to the tenth aspect, wherein the step of preparing a mixture material comprises a step of mixing unstabilized zirconia and calcium carbonate and yttrium oxide as an stabilizing agent.

A fifteenth aspect of the method of fabricating a calcining tool material of the present invention is a method according to the twelfth aspect, wherein the weight ratio of unstabilized zirconia to calcium carbonate is from 92:8 to 96:4.

A sixteenth aspect of the method of fabricating a calcining tool material of the present invention is a method according to the thirteenth aspect, wherein the weight ratio of unstabilized zirconia to yttrium oxide is from 90:10 to 96:4.

A seventeenth aspect of the method of fabricating a calcining tool material of the present invention is a method according to the tenth aspect, wherein the step of preparing a mixture material comprises a step of mixing the unstabilized zirconia and stabilized or partially-stabilized zirconia whose diameter are 70–130 µm.

An eighteenth aspect of the method of fabricating a calcining tool material of the present invention is a method according to the tenth aspect, wherein the step of preparing a mixture material comprises a step of granulating the mixture material so as to have a diameter of 70–130 µm.

In other words, the present invention is intended to incorporate stabilized part and unstabilized part which are intermingled each other in admixture in a flame spray coating layer of zirconia formed on the substrate of a calcining tool material, making it possible to absorb the residual expansion of stabilized zirconia when the calcining tool material is repeatedly heated and cooled. In a flame spray coating layer stabilized part is not dispersed surrounding an unstabilized part uniformly and stabilized part and an unstabilized part are intermingled each other complexly in admixture. The foregoing invention will be further described hereinafter.

The conventional calcining tool material having a flame spray coating layer formed on the surface of a substrate is obtained by flame-spraying any one of stabilized zirconia, partially-stabilized zirconia and unstabilized zirconia onto the surface of a substrate in a single layer or multiple layers. However, the coating layer of the calcining tool material of the present application comprises a stabilized part and an unstabilized part incorporated in admixture in the structure of a flame spray coating layer of zirconia so that even when repeatedly heated and cooled as a calcining tool material, the residual expansion of stabilized zirconia in particular is absorbed, minimizing the peeling of the flame spray coating layer and hence drastically improving the durability of the calcining tool material. The inventors consider that this is attributed to the following facts.

Stabilized zirconia or partially-stabilized zirconia is disadvantageous in that when acted upon by heat history developed by repeated use or a wetting component from the material to be calcined, it undergoes destabilization, i.e., becomes unstable to show a volumetric expansion that causes the structure to undergo residual expansion. Further, unstabilized zirconia is disadvantageous in that when acted upon by heat history, i.e., abnormal expansion and shrinkage caused by transformation characteristic of zirconia, its bonding strength becomes weak to cause the weakening of the structure. Thus, the calcining tool material thus proposed is soon worn to tatters.

However, the structure of the flame spray coating layer in the foregoing calcining tool material of the present invention has many fine cracks characteristic of unstabilized zirconia produced when the flame spray coating layer cools around the unstabilized zirconia part in the mixture of stabilized zirconia part and unstabilized zirconia part. It is thought that the presence of such fine cracks causes the absorption of volumetric expansion during destabilization accompanying heat history of stabilized zirconia during use of the calcining tool material, making it possible to prevent the peeling of the coating layer.

Further, the conventional flame spray coating layer of stabilized zirconia or partially-stabilized zirconia alone has a dense structure that shows a great thermal expansion coefficient and hence a reduced thermal impact resistance resulting in the cracking in the flame spray coating layer during use. Moreover, the difference in thermal expansion coefficient between the flame spray coefficient and the alumina-silica-based substrate causes the peeling of the flame spray coating layer or the cracking in the substrate. This can further causes warpage of the substrate. In accordance with the present application, on the contrary, the production of fine cracks in unstabilized zirconia prevents the resulting flame spray coating layer from being dense. The flame spray coating layer thus produced has a small thermal expansion coefficient that reduces the occurrence of peeling of the flame spray coating layer and cracking and warpage of the substrate.

DESCRIPTION OF THE PREFERRED EMBODIMENT

Figure 1:
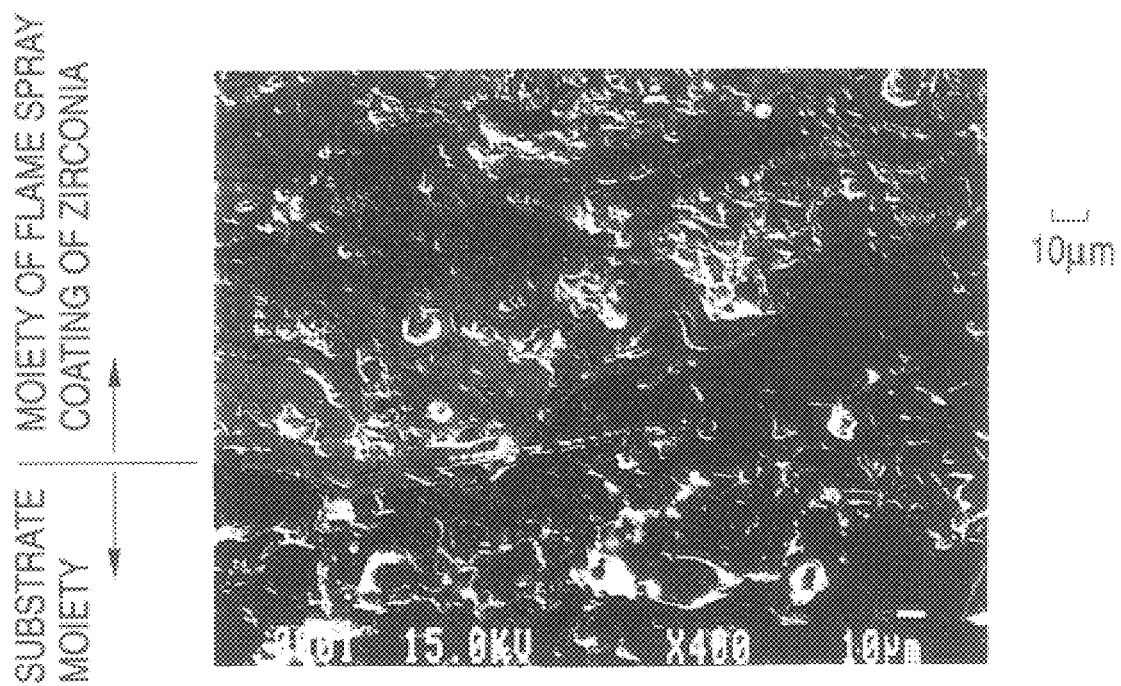
FIG. 1 is a scanning electron micrograph (SEM) illustrating the substrate and flame spray coating layer constituting an embodiment of the calcining tool material of the present invention.

The substrate of the calcining tool material of the present invention is an alumina-silica-based material having $Al_2O_3$ content of not less than 65% by weight. $Al_2O_3$ used as a main component of the substrate is desirable because it has a great hot strength, a high heat resistance and little adverse effect on the material to be calcined. The content of $Al_2O_3$ in the substrate needs to be not less than 65% by weight. If the content of $Al_2O_3$ in the substrate falls below 65% by weight, the content of $SiO_2$ is relatively higher than that of $Al_2O_3$, reducing the bending resistance of the substrate and hence making it impossible to use the product as a calcining tool material. Further, the amount of SiO gas produced from the substrate during actual use is increased, possibly giving some adverse effects on the properties of the material to be calcined.

In the present invention, a flame spray coating layer of zirconia having a structure comprising an unstabilized zirconia part and a stabilized or partially-stabilized zirconia part incorporated in admixture therein is formed on the surface of the foregoing substrate. In some detail, a flame spray coating layer of zirconia having an unstabilized zirconia part and a stabilized zirconia part incorporated in admixture therein or an unstabilized zirconia part and a partially-stabilized zirconia part incorporated in admixture therein is formed on the surface of the substrate.

The stabilized or partially-stabilized zirconia constituting the flame spray coating layer is obtained by stabilizing zirconia with CaO (calcium oxide) and/or yttrium oxide. In this case, referring to the weight ratio of the stabilizer to the unstabilized zirconia, the ratio of unstabilized zirconia to calcium oxide and unstabilized zirconia to yttrium oxide are preferably 92:8 to 96:4 and 90:10 to 96:4, respectively. As such stabilizers there may be used calcium oxide and yttrium oxide in combination.

The foregoing flame spray coating layer of zirconia is formed by a process which comprises mixing unstabilized zirconia and stabilized or partially-stabilized zirconia in powder form as starting materials, and then flame-spraying the mixture onto a substrate. In this process, the particle diameter of the starting material is preferably from 70 to 130 μm. Alternatively, such a starting material to be flame-sprayed may be prepared by granulating a mixture of finer powdered starting materials to a particle diameter of from 70 to 130 μm.

Further, the stabilized or partially-stabilized zirconia part constituting the foregoing flame spray coating layer of zirconia may be formed by flame-spraying unstabilized zirconia and calcium oxide and/or yttrium oxide as a stabilizer at the same time onto the surface of the substrate so that a part of the zirconia material is stabilized or partially-stabilized by heat accompanying the flame spraying. Calcium carbonate is desirable because it is effective as CaO source for zirconia solid solution stabilizer and inexpensive. Besides these stabilizers, $Ca(OH)_2$ and calcium acetate may be used. The amount of such a stabilizer, if used, is the same as calcium carbonate as calculated in terms of CaO. An alternate process may comprise mixing unstabilized zirconia with the foregoing CaO source such as calcium carbonate and/or yttrium oxide, granulating the mixture, and then flame-spraying the granulated material. In this case, too, referring to the weight ratio of the stabilizer to the unstabilized zirconia, the ratio of unstabilized zirconia to calcium oxide and unstabilized zirconia to yttrium oxide are preferably 92:8 to 96:4 and 90:10 to 96:4, respectively.

In the calcining tool material thus prepared, the proportion of unstabilized zirconia in the flame spray coating layer is preferably from 5 to 50% by weight, particularly from 10 to 30% by weight, from the standpoint of stabilization and durability. The flame spraying may be effected by any ordinary method. The flame spray coating layer may be formed on the entire surface of the substrate. Alternatively, it may be formed on a part of the surface of the substrate, including the area on which the material to be calcined is placed. The thickness of the flame spray coating layer is preferably from 200 to 1,000 μm. If the thickness of the flame spray coating layer falls below 200 μm, the resulting effect of stabilization and durability is insufficient. On the contrary, if the thickness of the flame spray coating layer exceeds 1,000 μm, even the flame spray coating layer cannot prevent frequent being peeled off.

EXAMPLE

Examples 1–8; Comparative Examples 1–3

As set forth in Table 1, a powder mixture of unstabilized zirconia, partially-stabilized zirconia obtained by partiallystabilizing zirconia with 4% by weight of CaO and stabilized zirconia obtained by stabilizing zirconia with 6% by weight of CaO was flame-sprayed onto a substrate comprising 65% by weight of $Al_2O_3$ and the balance of $SiO_2$. As a result, a calcining tool material was obtained having a flame spray coating layer of zirconia having a thickness of 0.3 mm formed on one side of a substrate having a size of 215× 215×8 mm. Separately, a granulated material obtained by granulating the same starting material as used above was flame-sprayed onto the same substrate as used above to obtain a calcining tool material. The particle diameter of the mixed powder used in the former case was from 70 to 130 μm. The granulated material used in the latter case was obtained by granulating a powder having an average particle diameter of 5 μm to a particle diameter of from 70 to 130 μm.

The calcining tool materials thus prepared were each subjected to a heating cycle between 300° C. and 1,400° C. in an electric furnace to examine the occurrence of peeling and wear of the flame spray coating layer and cracking and warpage of the substrate. Further, these calcining tool materials were actually used in the calcining of ceramic capacitor at 1,400° C. to examine their durability. The results are set forth in Table 1. Table 1 also shows the results of experiment of comparative examples having unstabilized zirconia, partially-stabilized zirconia and stabilized zirconia alone, respectively, as a coating layer.

Figure 2:
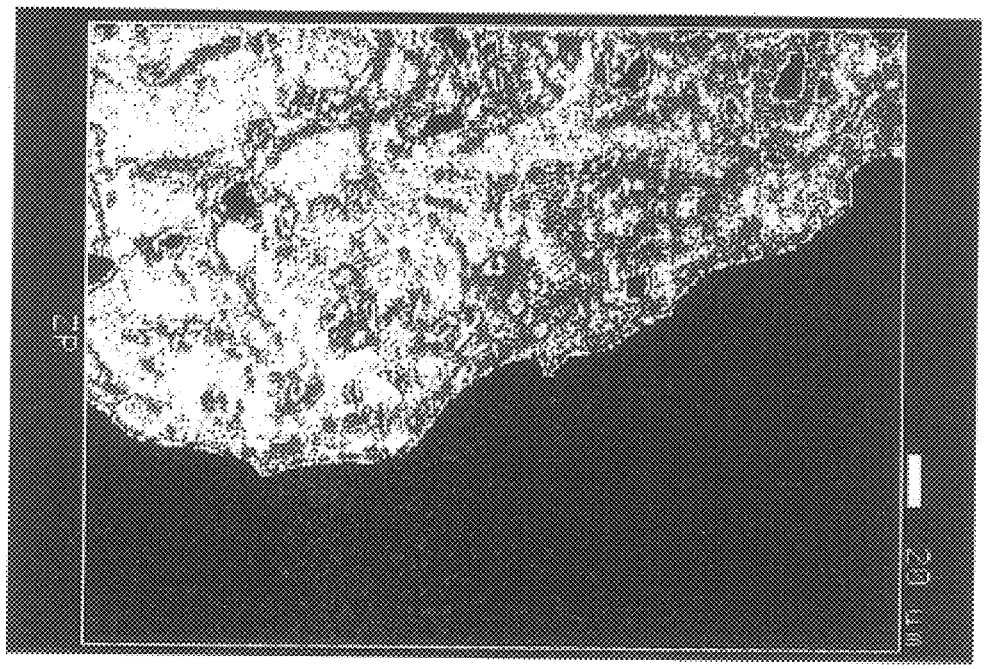
FIG. 2 is a scanning electron micrograph (SEM) of the same section as in FIG. 1 illustrating the distribution of concentration of zirconium in the flame spray coating layer constituting an embodiment of the calcining tool material of the present invention.
Figure 3:
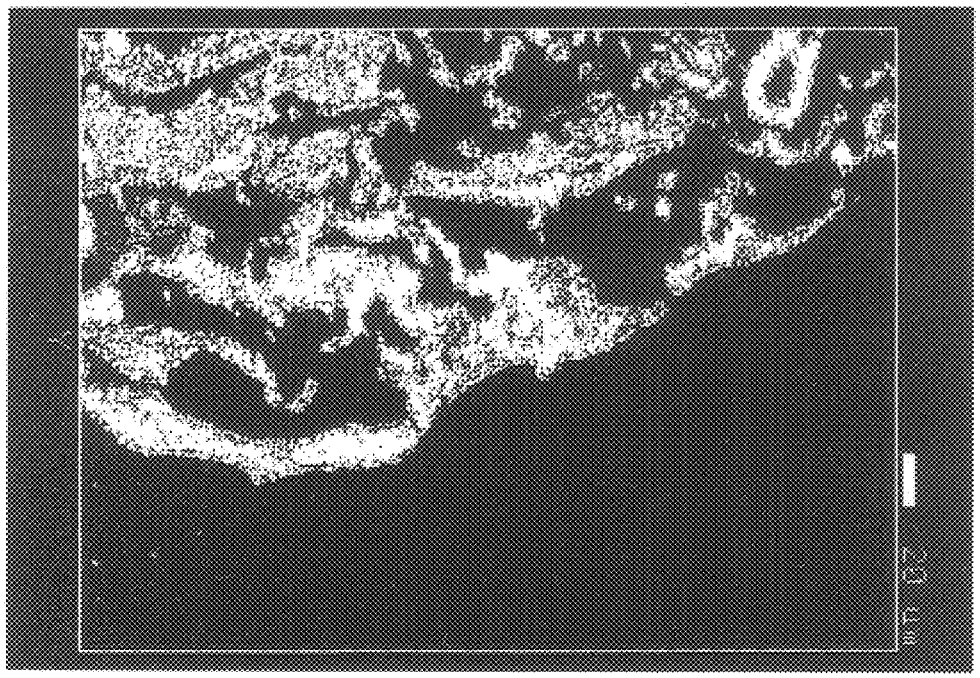
FIG. 3 is a scanning electron micrograph (SEM) of the same section as in FIG. 1 illustrating the distribution of yttrium element with respect to yttrium oxide ($Y_2O_3$) as one of zirconia stabilizing components in the flame spray coating layer constituting an embodiment of the calcining tool material of the present invention.

FIG. 1 shows a scanning electron micrograph (SEM) of a calcining tool material illustrating an embodiment of the present invention. This sample comprises $Y_2O_3$ incorporated therein as a stabilizer in an amount of 4%. In FIG. 1, the lower portion illustrates the substrate part while the upper portion illustrates the part of flame spray coating layer of zirconia. It can be seen in this SEM that the flame spray coating layer of zirconia has many fine linear cracks. FIG. 2 is a scanning electron micrograph (SEM) illustrating the distribution of concentration of zirconium in the part of flame spray coating layer of zirconia. In FIG. 2, the white portion illustrates the portion where the element concentration is high while the black portion illustrates the portion where the zirconium concentration is low. FIG. 3 is a scanning electron micrograph (SEM) illustrating the distribution of yttrium element with respect to yttrium oxide ($Y_2O_3$) as one of zirconia stabilizing components. The white portion, in which yttrium is present, illustrates a portion stabilized with yttria while the black portion illustrates unstabilized zirconia. This demonstrates that a coating layer having unstabilized zirconia and stabilized and/or partially-stabilized zirconia incorporated in admixture therein is formed.

Kind: kind of zirconnia material in flame spray coating layer
Unsta.zirco.: Unstabilized zirconia CaO content 0%
Part. Zirco.: Partially-stabilized zirconia CaO content 4%
Stab. Zirco.: Stabilized zirconia CaO content 6%
Number of peeling: Number of occurrence of peeling in electric furnace test
Crack and warpage: Crack and warpage of substrate in electric furnace test
Number of operations: Number of operations allowable in actual use As shown in Examples 1 to 8, the samples of the present invention can withstand many times of use in the electric furnace test until the peeling and cracking of the coating layer and the warpage of the substrate occur. Further, these samples can withstand many times of operation in actual use. Thus, these samples can be found to be desirable calcining tool materials. On the contrary, the samples of Comparative Examples provide undesirable results in the electric furnace test. Thus, these samples can, of course, withstand less times of operation in actual use.

Comparative Examples 4–6

A sample obtained by providing a coating layer having CaO content of 30% by weight and a stabilized zirconia content of 100% by weight on the same substrate as in Example 1 (Comparative Example 4), a sample obtained by a process which comprises providing a flame spray coating layer of alumina on the same substrate as mentioned above, and then providing a partially-stabilized zirconia layer having CaO content of 4% by weight on the flame spray coating layer of alumina (Comparative Example 5), and a sample obtained by a process which comprises providing a stabilized zirconia layer having CaO content of 15% by weight on the same substrate as mentioned above, providing a stabilized zirconia layer having CaO content of 8% by weight on the stabilized zirconia layer, and then providing a partially-stabilized layer having CaO content of 4% by weight on the stabilized zirconia layer (Example 6) were each subjected to the same experiment as effected in Example 1.

In some detail, these calcining tool materials were each subjected to heating cycle between 300° C. and 1,400° C. in an electric furnace to examine the occurrence of peeling and wear of the flame spray coating layer and cracking and warpage of the substrate. Further, these calcining tool materials were actually used in the calcining of ceramic capacitor at 1,400° C. to examine their durability. The results are set forth in Table 2.

TABLE 1

|  | Mixing process Exm. | | | | Granulating process Exm. | | | | Comparative Exm. | | |
| --- | --- | --- | --- | --- | --- | --- | --- | --- | --- | --- | --- |
| Coating layer | 1 | 2 | 3 | 4 | 5 | 6 | 7 | 8 | 1 | 2 | 3 |
| Unsta. Zirco. | 10 | 30 | 10 | 30 | 10 | 30 | 10 | 30 | 100 | | |
| Part. Zirco. | 90 | 70 | | | 90 | 70 | | | | 100 | |
| Stab. Zirco. | | | 90 | 70 | | | 90 | 70 | | | 100 |
| Number of peeling | 32 | 25 | 38 | 30 | 28 | 20 | 33 | 25 | 3 worn | 11 | 6 |
| Crack and warpage | None | None | None | None | None | None | None | None | Small | Small | Great |
| Number of operations | 55 Peeled | 48 Peeled | 74 Peeled | 47 Peeled | 45 Peeled | 41 Peeled | 68 Peeled | 43 Peeled | 3 Worn | 23 Peeled | 15 do. |

TABLE 2

| Flame spray coating layer | Comparative Example 4 | Comparative Example 5 | Comparative Example 6 |
|---|---|---|---|
| Stabilized zirconia CaO content 20% | 100 | | |
| Double flame spray coating layer *3 | | 100 | |
| Gradient CaO concentration flame spray coating layer*4 | | | 100 |
| Number of occurrence of peeling in electric furnace test | 8 | 20 | 22 |
| Cracking and warpage of substrate in electric furnace test | Small | Great | Great |

TABLE 2-continued

| Flame spray coating layer | Comparative Example 4 | Comparative Example 5 | Comparative Example 6 |
|---|---|---|---|
| Number of operations allowable in actual use | 2 Peeled | 28 Peeled | 34 Peeled |

*3 A flame spray coating layer of alumina was formed on a substrate to a thickness of 0.15 mm. A flame spray coating layer of zirconia having CaO content of 4% by weight was then formed on the flame spray coating layer of alumina to a thickness of 0.15 mm.
*4 Zirconia having CaO content of 15% by weight as a starting material was flame-sprayed onto a substrate to a thickness of 0.1 mm. Zirconia having CaO content of 8% by weight was then flame-sprayed onto the flame spray coating layer to a thickness of 0.1 mm. Zirconia having CaO content of 4% by weight was then flame-sprayed onto the flame spray coating layer to a thickness of 0.1 mm. Thus, the thickness of the flame spray coating layers totals 0.3 mm.

In Comparative Examples 5 and 6, not to mention Comparative Example 4, the substrate suffered cracking and warpage. Thus, none of these samples are desirable as a calcining tool material.

Examples 9–16; Comparative Examples 7–9

Unstabilized zirconia having an average particle diameter of 100 μm and a purity of 99.2% and a stabilizer having a particle diameter of not greater than 45 μm and a purity of 99.8% (calcium carbonate or yttrium oxide) were mixed or granulated according to the formulation set forth in Table 3. These starting materials were each flame-sprayed onto a substrate comprising 85% by weight of $Al_2O_3$ and the balance of $SiO_2$. As a result, a calcining tool material was obtained having a flame spray coating layer of zirconia having a thickness of 0.3 mm formed on one side of a substrate having a size of 215×215×8 mm.

The calcining tool materials thus prepared were each subjected to a heating cycle between 300° C. and 1,400° C. in an electric furnace in the same manner as in Example 1 to examine the occurrence of peeling and wear of the flame spray coating layer and cracking and warpage of the substrate. Further, these calcining tool materials were actually used in the calcining of ceramic capacitor at 1,400° C. to examine their durability. The results are set forth in Table 3. Table 3 also gives the results of experiment of a calcining tool material comprising partially-stabilized zirconia having CaO content of 4% by weight as a coating layer (Comparative Example 8) and a calcining tool material comprising stabilized zirconia having CaO content of 6% by weight as a coating layer (Comparative Example 9) as compared with that of a calcining tool material comprising unstabilized zirconia (Comparative Example 7).

TABLE 3

| | Mixing process Exam. | | | | Granulating process Exam. | | | | Comparative | | |
|---|---|---|---|---|---|---|---|---|---|---|---|
| Kind | 9 | 10 | 11 | 12 | 13 | 14 | 15 | 16 | 7 | 8 | 9 |
| Unsta. Zirco. | 96 | 92 | 96 | 90 | 96 | 92 | 96 | 90 | 100 | | |
| Part. Zirco. | | | | | | | | | | 100 | |
| Stab. Zirco. | | | | | | | | | | | 100 |
| $CaCO_3$ | 4 | 8 | | | 4 | 8 | | | | | |
| $Y_2O_3$ | | | 4 | 10 | | | 4 | 10 | | | |
| Number of peeling | 36 | 32 | 40 | 37 | 35 | 30 | 39 | 33 | 3 worn | 11 | 6 |
| Crack and warpage | None | None | None | None | None | None | None | None | Small | Small | Large |
| Number of operation | 60 Peeled | 58 Peeled | 82 Peeled | 67 Peeled | 56 Peeled | 52 Peeled | 81 Peeled | 60 Peeled | 3 Worn | 23 Peeled | 15 do. |

Kind: kind of zirconnia material in flame spray coating layer
   Unsta.zirco.: Unstabilized zirconia CaO content 0%
   Part. Zirco.: Partially-stabilized zirconia CaO content 4%
   Stab. Zirco.: Stabilized zirconia CaO content 6%
Number of peeling: Number of occurrence of peeling in electric furnace test
Crack and warpage: Crack and warpage of substrate in electric furnace test
Number of operations: Number of operations allowable in actual use As shown in Examples 9 to 16, the samples of the present invention can withstand many times of use in the electric furnace test until the peeling and cracking of the coating layer and the warpage of the substrate occur. Further, these samples can withstand many times of operation in actual use. On the contrary, the samples of Comparative Examples provide undesirable results in the electric furnace test. Thus, these samples can, of course, withstand less times of operation in actual use.

Examples 17–18; Comparative Examples 10–19

Unstabilized zirconia having an average particle diameter of 100 μm and a purity of 99.2% and a stabilizer having a particle diameter of not greater than 45 μm and a purity of 99.8% (calcium carbonate or yttrium oxide) were mixed according to the formulation set forth in Table 4. These starting materials were each flame-sprayed onto a substrate comprising 85% by weight of $Al_2O_3$ and the balance of $SiO_2$. As a result, a calcining tool material was obtained having a flame spray coating layer of zirconia having a thickness of 0.3 mm formed on one side of a substrate having a size of 215×215×8 mm.

The calcining tool materials thus prepared were each subjected to a heating cycle between 300° C. and 1,400° C. in an electric furnace in the same manner as in Example 1 to examine the occurrence of peeling and wear of the flame spray coating layer and cracking and warpage of the substrate. Further, these calcining tool materials were actually used in the calcining of ceramic capacitor at 1,400° C. to examine their durability. The results are set forth in Table 4.

Table 4 also shows as comparative examples the results of experiment of calcining tool materials having coating layers comprising unstabilized zirconia and different amounts of calcium carbonate and/or yttrium oxide as a stabilizer.

TABLE 4

| Kind of coating layer | Examples | | Comparative Examples | | | | | | | Compara. Ex | | |
|---|---|---|---|---|---|---|---|---|---|---|---|---|
| | 17 | 18 | 10 | 11 | 12 | 13 | 14 | 15 | 16 | 7 | 8 | 9 |
| Unsta. zirco. | 96 | 92 | 97 | 97 | 87 | 97 | 97 | 88 | 88 | 97 | 97 | 87 |
| CaCO$_3$ | 2 | 2 | 3 | | | 1 | 2 | 8 | 2 | 3 | | |
| Y$_2$O$_3$ | 2 | 6 | | 3 | 13 | 2 | 1 | 4 | 10 | | 3 | 13 |
| Number of peeling | 34 | 47 | 20 | 22 | 19 | 25 | 22 | 7 | 12 | 16 | 27 | 20 |
| Crack and warpage | No | No | No | No | Mid. | No | No | Mid. | Mid. | No | No | Mid. |
| Number of operations | 51 | 105 Peeled | 33 Peeled | 35 do. | 18 do. | 33 do. | 31 do. | 15 do. | 18 do. | 28 | 35 Peeled | 15 |

Kind: kind of zirconnia material in flame spray coating layer
Exanple 17,18: Mixing process
Unsta.zirco.: Unstabilized zirconia CaO content 0%
Part. Zirco.: Partially-stabilized zirconia CaO content 4%
Stab. Zirco.: Stabilized zirconia CaO content 6%
Number of peeling: Number of occurrence of peeling in electric furnace test
Crack and warpage: Crack and warpage of substrate in electric furnace test
Number of operations: Number of operations allowable in actual use As shown in Table 4, if the content of calcium carbonate and/or yttrium oxide is too small or great, the resulting calcining tool materials provide poor results in the peeling test in an electric furnace and a poor durability in actual use.

As mentioned above, the calcining tool material of the present invention comprises a firm flame spray coating layer of zirconia formed on the surface of a substrate. The coating layer is formed comprising unstabilized zirconia and stabilized or partially-stabilized zirconia incorporated in admixture therein. Accordingly, many fine cracks characteristic of unstabilized zirconia produced when the flame spray coating layer cools are present around the unstabilized zirconia part, causing the absorption of volumetric expansion during destabilization accompanying heat history of stabilized zirconia during actual use of the calcining tool material. Thus, the calcining tool material of the present invention is liable to less occurrence of peeling of flame spray coating layer and hence can exhibit a drastically enhanced durability.

What is claimed is:

1. A calcining tool material, comprising an alumina-silica-based substrate having an Al$_2$O$_3$ content of not less than 65% by weight and a flame-sprayed zirconia coating layer made of unstabilized zirconia and stabilized or partially-stabilized zirconia in admixture, formed on the surface of the alumina-silica-based substrate.

2. The calcining tool material according to claim 1, wherein said stabilized or partially-stabilized zirconia is obtained by stabilizing with CaO.

3. The calcining tool material according to claim 1, wherein said stabilized or partially-stabilized zirconia is obtained by stabilizing with Y$_2$O$_3$.

4. The calcining tool material according to claim 1, wherein said stabilized or partially-stabilized zirconia is obtained by stabilizing with CaO and Y$_2$O$_3$.

5. The calcining tool material according to claim 1, wherein said stabilized or partially-stabilized zirconia is obtained by stabilizing with CaO originated from CaCO$_3$.

6. The calcining tool material according to claim 1, wherein said stabilized or partially-stabilized zirconia is obtained by stabilizing with CaO originated from Ca(OH)$_2$.

7. The calcining tool material according to claim 1, wherein said flame-sprayed zirconia coating layer comprises 5–50 weight % of unstabilized zirconia.

8. The calcining tool material according to claim 1, wherein said flame-sprayed zirconia coating layer comprises 10–30 weight % of unstabilized zirconia.

9. A calcining tool material comprising an alumina-silica-based substrate having an Al$_2$O$_3$ content of not less than 65% by weight and a flame-sprayed zirconia coating layer made of unstabilized zirconia and stabilized or partially-stabilized zirconia in admixture, formed on the surface of the alumina-silica-based substrate, wherein said flame-sprayed zirconia coating layer has a thickness of 200–1000 μm.

10. A calcining tool material, comprising an alumina-silica-based substrate having an Al$_2$O$_3$ content of not less than 65% by weight and a flame-sprayed zirconia coating layer made of unstabilized zirconia and stabilized or partially-stabilized zirconia intermingled together in admixture, formed on the surface of the alumina-silica-based substrate.

11. A method of fabricating a calcining tool material according to claim 1, comprising the steps of:

preparing a mixture material by mixing an unstabilized zirconia and stabilized or partially-stabilized zirconia; and flame-spraying the mixture in admixture onto a surface of an alumina-silica-based substrate having an Al$_2$O$_3$ content of not less than 65% by weight to form a flame-spray coating layer made of unstabilized zirconia and stabilized or partially-stabilized zirconia thereon.

12. The method of fabricating a calcining tool material according to claim 11, wherein the step of preparing a mixture material comprises previously mixing unstabilized zirconia and stabilized or partially-stabilized zirconia; and granulating the mixture material; and the step of flame-spraying the granulated material to form a flame-spray coating layer.

13. The method of fabricating a calcining tool material according to claim 11, wherein the step of preparing a mixture material comprises a step of mixing unstabilized zirconia and calcium carbonate as an stabilizing agent.

14. The method of fabricating a calcining tool material according to claim 11, wherein the step of preparing a mixture material comprises a step of mixing unstabilized zirconia and yttrium oxide as an stabilizing agent.

15. The method of fabricating a calcining tool material according to claim 11, wherein the step of preparing a mixture material comprises a step of mixing unstabilized zirconia and calcium carbonate and yttrium oxide as an stabilizing agent.

16. The method of fabricating a calcining tool material according to claim 13, wherein the weight ratio of unstabilized zirconia to calcium carbonate is from 92:8 to 96:4.

17. The method of fabricating a calcining tool material according to claim 14, wherein the weight ratio of unstabilized zirconia to yttrium oxide is from 90:10 to 96:4.

18. The method of fabricating a calcining tool material according to claim 11, wherein the step of preparing a mixture material comprises a step of mixing the unstabilized zirconia and stabilized or partially-stabilized zirconia whose diameter are 70–130 $\mu$m.

19. The method of fabricating a calcining tool material according to claim 11, wherein the step of preparing a mixture material comprises a step of granulating the mixture material so as to have a diameter of 70–130 $\mu$m.

* * * * *